106. COMPOSITIONS, COATING OR PLASTIC.s.
96

Patented Apr. 22, 1930

1,755,638

*[Handwritten annotation: Renders cement waterproof by the addition thereto of Filtering clay containing Polymerized resinous asphaltic substances adsorbed by the clay during the filtration therethrough of liquid hydrocarbon. Examiner]*

UNITED STATES PATENT OFFICE

JOHN M. EVANS, OF BERKELEY, CALIFORNIA, ASSIGNOR OF ONE-HALF TO GEORGE W. WALLACE, OF SAN FRANCISCO, CALIFORNIA

MANUFACTURE OF WATERPROOF CEMENT

No Drawing.  Application filed June 20, 1928.  Serial No. 287,036.

This invention relates to the manufacture of waterproof cement and like cementitious substances, and comprises a method of waterproofing cement which imparts to the resultant cement mixture increased tensile strength and greater plasticity.

In the manufacture of waterproof cement, various agents may be used, such for instance, as petroleum, coal tar, tallow and like substances. It is common practice to add these substances, either alone or in combination, to the cement during or after manufacture; generally a residual petroleum oil alone, or combined with fatty acids is used.

I have found that only small quantities of such waterproofing agents can be added to cement without causing a decrease in the tensile strength of the resultant cement mixture or concrete prepared from the same. I have also found that such agents lose their efficiency, to some extent, after the concrete or cement mixture has set up, due in some instances to the gradual evaporation of the agents used, and in some instances to a partial solution or replacement of the same, where the resultant cement mixture or concrete is subjected to the action of water. For this reason, these agents, to some extent at least, are only temporary in their beneficial action. However, the use of the same produces a cement mixture or concrete of improved quality, due to the increased plasticity of the product at the time of mixing and results in a much denser and more compact concrete.

In refining petroleum oil, where the same is filtered and decolorized, using an active or activated adsorbent clay, the components of the petroleum or its fractions which are removed through the action of the clay, consists of asphaltic and resinous substances, which are in part, polymerized products, and which are in part not soluble either in oil or water, and apparently not volatile.

I have discovered as a result of my investigation, that these products when mixed with Portland cement or like cementitious products, cause the same to be virtually impervious to water, after the initial set of the cement mixture or concrete takes place.

Further, I have found that this material, when added to the cement or cement mixture, in the proper proportions, materially increases its tensile strength.

As it is virtually impossible to separate the resinous, asphaltic substances adsorbed by the clay used in the filtering process, the preferred method of carrying out my process is to add to the cement, either at the time of its manufacture, or when it is used, a proportion of the filtering clay containing the adsorbed polymerized, resinous and asphaltic bodies resulting from the action of the clay upon the petroleum or its fractions. I have found that the use of small proportions of this material will produce the desired results and impart a decided increase in the tensile strength to the finished cement, whether it is a neat cement or a sand cement mixture.

I do not wish to limit myself to the proportion of material to be used, as I have found its action to be cumulative in effect, especially its waterproofing characteristics. I have definitely determined that less than 5% of the material, with reference to the quantity of neat cement, shows marked waterproofing, and in percentages above 25%, the cement becomes practically impervious to water. Contrary to the usual characteristics found in waterproof cement, I have found that my process increases rather than decreases the tensile strength of the final cement mixture or concrete. This is especially true where between 5% and 25% of the material, with reference to the quantity of neat cement, is used.

Another advantage of my process is that the resinous substances adsorbed by and incorporated with the filtering clay, when added to the cement, make the same very plastic and give a much smoother surface to the finished cement mixture or concrete.

The material which I use in carrying out my process is obtained at any petroleum refinery using the so-called contact filtration method for decolorizing petroleum distillates. It is customary in such operations to use a finely ground adsorbent clay for decolorizing and purifying lubricating oils and other petroleum fractions. This material, after it has performed its decolorizing work, is highly charged with asphaltic and resinous bodies adsorbed from the oil, and I have found it imparts superior waterproofing properties as well as increased tensile strength and great plasticity to the cement or cement mixture. In this condition it is a suitable material for use in carrying out my process.

The adsorbent clay which, in many instances is a magnesium silicate clay as used in the filtration and purification of petroleum and/or its fractions, is usually ground to a fineness of 200 mesh and in some cases treated with a mineral acid to increase its activity. Many clays have the required active qualities without this acid treatment, however, the clay may be activated before its use. Due to the fact that it is finely ground, it is usually unnecessary to further pulverize the clay before adding it to the cement mixture or concrete. It is preferable to add the material to the neat cement and thoroughly mix the same in any suitable manner before using the cement for construction purposes.

While I have described the manner in which a suitable material can be produced for use in carrying out my process, similar material answering the purpose can be produced where hydrocarbons other than petroleum are clarified and purified using an adsorbent clay for the purpose. Many natural clays function as decolorizing and purifying agents in the treatment of hydrocarbons. I have found that usually the more active the clay is in its action, the more pronounced are the results secured when using the same in practicing my process. This is probably due to the fact that the degree of activity of the clay in a manner controls the character of adsorbed resinous and asphaltic bodies. For this reason I do not wish to limit my invention to any particular clay or the adsorbed bodies from any particular hydrocarbon. The clay may be a natural clay or a specially prepared clay, but it must have the property of reacting on the hydrocarbon being filtered and of retaining the polymerized, resinous and asphaltic bodies.

What I claim is:

1. The process of rendering cement structures waterproof, which consists in mixing with the cement, filtering clay containing polymerized resinous asphaltic substances.

2. The process of waterproofing cement, which consists in mixing therewith activated clay containing resinous and asphaltic substances adsorbed by the clay during the filtration of liquid hydrocarbons.

3. A composition of matter, consisting of cement mixed with filtering clay impregnated with adsorbed petroleum and asphaltic bodies.

4. The process of manufacturing waterproof cement, which consists in mixing with Portland cement, a definite proportion of filtering clay containing the adsorbed polymerized resinous and asphaltic substances resulting from the action of the clay upon petroleum and its fractions.

5. A waterproof cement, consisting of Portland cement mixed with filtering clay containing the adsorbed resinous and asphaltic substances resulting from the action of the clay upon petroleum and its fractions.

JOHN M. EVANS.